United States Patent
Kim et al.

(10) Patent No.: US 9,881,263 B2
(45) Date of Patent: Jan. 30, 2018

(54) METHOD AND APPARATUS FOR DECIDING PATH OF VEHICLE

(71) Applicant: AJOU UNIVERSITY INDUSTRY-ACADEMIC COOPERATION FOUNDATION, Suwon-si, Gyeonoggi-do (KR)

(72) Inventors: Jai-Hoon Kim, Seongnam-si (KR); Temesgen Seyoum Alemayehu, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 15/191,764

(22) Filed: Jun. 24, 2016

(65) Prior Publication Data
US 2017/0357918 A1 Dec. 14, 2017

(30) Foreign Application Priority Data
Jun. 8, 2016 (KR) .................. 10-2016-0070771

(51) Int. Cl.
*G01C 21/34* (2006.01)
*G06Q 10/04* (2012.01)
(Continued)

(52) U.S. Cl.
CPC ......... *G06Q 10/047* (2013.01); *G01C 21/343* (2013.01); *G01S 5/0242* (2013.01);
(Continued)

(58) Field of Classification Search
CPC .. G06Q 10/047; G01C 21/343; G01S 5/0242; G01S 5/0294; G05D 1/0276; G05D 1/101
See application file for complete search history.

(56) References Cited

U.S. PATENT DOCUMENTS

| 5,768,353 | A | * | 6/1998 | Browne | ................ | H04M 15/00 |
| | | | | | | 379/115.03 |
| 5,889,677 | A | * | 3/1999 | Yasuda | ............... | G06F 17/5022 |
| | | | | | | 716/113 |

(Continued)

FOREIGN PATENT DOCUMENTS

| WO | WO-2010002073 A1 | * | 1/2010 | ............. | G04F 10/00 |
| WO | WO-2010067458 A1 | * | 6/2010 | .......... | B61L 27/0016 |

*Primary Examiner* — Tuan C To
(74) *Attorney, Agent, or Firm* — Sughrue Mion, PLLC (57) ABSTRACT

A route determining method includes determining a first node which is the closest to a current position, among a plurality of nodes by using a position sensor and moving in a direction of the determined first node, determining a first point included in a radio wave reachable area of the first node by transmitting and receiving data between the moving object and the first node and going through the determined first point, determining a second node which is the closest to the first point by using the position sensor and moving in a direction of the determined second node, and determining a second point included in a radio wave reachable area of the second node by transmitting and receiving the data between the moving object and the second node based on the first node and a position of the first point and going through the second point.

11 Claims, 7 Drawing Sheets

(51) Int. Cl.
*G01S 5/02* (2010.01)
*G05D 1/02* (2006.01)
*G05D 1/10* (2006.01)

(52) U.S. Cl.
CPC .......... *G01S 5/0294* (2013.01); *G05D 1/0276* (2013.01); *G05D 1/101* (2013.01)

(56) References Cited

U.S. PATENT DOCUMENTS

| | | | | |
|---|---|---|---|---|
| 6,081,803 | A * | 6/2000 | Ashby | G01C 21/32 |
| 6,421,606 | B1 * | 7/2002 | Asai | G01C 21/3423 |
| | | | | 701/410 |
| 2003/0212941 | A1 * | 11/2003 | Gillies | H04L 41/046 |
| | | | | 714/726 |
| 2004/0215388 | A1 * | 10/2004 | Takenaka | G01C 21/343 |
| | | | | 701/423 |
| 2008/0177462 | A1 * | 7/2008 | Yoshioka | G01C 21/343 |
| | | | | 701/532 |
| 2008/0280625 | A1 * | 11/2008 | Larsen | G01S 5/0226 |
| | | | | 455/456.1 |
| 2010/0004798 | A1 | 1/2010 | Bodin et al. | |
| 2011/0153200 | A1 * | 6/2011 | Tsuji | G01C 21/3658 |
| | | | | 701/533 |
| 2011/0246061 | A1 * | 10/2011 | Hayashi | G01C 21/343 |
| | | | | 701/533 |
| 2012/0197713 | A1 * | 8/2012 | Stroila | G01C 21/3614 |
| | | | | 705/14.49 |
| 2012/0209524 | A1 * | 8/2012 | Okude | G01C 21/343 |
| | | | | 701/540 |
| 2013/0304378 | A1 * | 11/2013 | Graells | G01C 22/00 |
| | | | | 701/533 |
| 2015/0142258 | A1 * | 5/2015 | Sugihara | G06Q 50/02 |
| | | | | 701/32.3 |
| 2016/0187152 | A1 * | 6/2016 | Tanizaki | G09B 29/005 |
| | | | | 701/414 |
| 2017/0016730 | A1 * | 1/2017 | Gawrilow | G01C 21/30 |
| 2017/0016732 | A1 * | 1/2017 | Ashton | G06F 17/30625 |
| 2017/0016733 | A1 * | 1/2017 | Rolf | G01C 21/34 |
| 2017/0154394 | A1 * | 6/2017 | Kan | G06Q 50/28 |
| 2017/0192436 | A1 * | 7/2017 | Min | G05D 1/0276 |
| 2017/0241792 | A1 * | 8/2017 | Nagase | G01C 21/3484 |
| 2017/0261330 | A1 * | 9/2017 | Zhou | G01C 21/343 |

* cited by examiner

METHOD AND APPARATUS FOR DECIDING PATH OF VEHICLE

CROSS REFERENCE TO RELATED APPLICATIONS

This application claims priority from Korean Patent Application No. 1-2016-0070771 filed on Jun. 8, 2016 in the Korean Intellectual Property Office, the disclosure of which is incorporated herein by reference in its entirety.

TECHNICAL FIELD

The present invention relates to a method and an apparatus for determining a moving route of a moving object, and more particularly, to a method and an apparatus for efficiently determining a moving route when a moving object visits a plurality of scattered nodes.

BACKGROUND ART

Recently, in accordance with development of an IT technology, a field which uses a moving flight vehicle such as a drone has rapidly developed. Therefore, the drone is utilized not only for a military purpose but also for various fields including business and agriculture. Further, it is expected that the drone will be applied to many different fields in the future. For example, monitoring is performed using a drone. With regard to this, a route determining method which allows a moving object such as a drone to return via a plurality of destination nodes has been discussed.

When the moving object is sent to a plurality of destinations which are scattered over a wide region, a method of moving the shortest distance has been studied in the related art as a problem in which when n cities and a distance between cities are given, the shortest route that visits each city exactly once but visits all the cities is obtained, that is, as a traveling salesperson problem (TSP). However, as places to visit are increased, possible numbers of n! (=1*2*3* ... (n−1)*n) need to be compared. Therefore, the complexity is increased and thus a computation time is significantly increased so that it is difficult to actually use the above-mentioned method. Further, as a heuristic algorithm, a nearest neighbor heuristic algorithm (NN) which sequentially visits nodes closer to the current location among nodes which are not visited is known as a practical alternative.

However, the above-mentioned moving route determining method only suggests a method which visits a plurality of destinations treated as points through the shortest route. In the case of a destination such as a sensor node having a predetermined communication distance, an object may be achieved only by accessing to be close to a predetermined point without directly visiting the predetermined point. The above-mentioned method does not suggest a method for treating the above-mentioned destination having a predetermined radius.

RELATED ART DOCUMENT

[Patent Document] US 20100004798

SUMMARY OF THE INVENTION

The present invention has been made in an effort to provide a method and an apparatus for allowing a moving object having a plurality of destinations to move the shortest distance to visit the destinations.

Specifically, the present invention has been made in an effort to provide a method and an apparatus for allowing a moving object to move the shortest distance to visit a plurality of destinations having a predetermined radius.

An exemplary embodiment of the present invention provides route determining method of a moving object including determining, by the moving object, a first node which is the closest to a current position, among a plurality of nodes and moving in the determined first node direction; determining, by the moving object, a first point included in a radio wave reachable area of the first node and going through the determined first point; determining, by the moving object, a second node which is the closest to the first point and moving in the determined second node direction; and determining, by the moving object, a second point included in a radio wave reachable area of the second node by considering the first node and the position of the first point and going through the second point.

In the determining, by the moving object, a first point included in a radio wave reachable area of the first node, the first point may be determined by considering a first time when it takes for the moving object to move from the boundary of the radio wave reachable area of the first node to an arbitrary point included in the radio wave reachable area and a second time when it takes for the moving object to receive data to be obtained from the first node at the arbitrary point.

In the determining of a second point, the second point may be determined by determining whether to be at a boundary of the radio wave reachable area of the second node and whether to be located in the closest distance from the first point.

In the determining of a second point, the second point may be determined by determining whether to be at a boundary of the radio wave reachable area of the second node and whether to be located in the closest distance from the first node.

In the determining of a second point, the second point may be located between a first intersection point between a segment of a line connecting the first node and the second node and the boundary of the radio wave reachable area of the second node and a second intersection point between a segment of a line connecting the first point and the second node and the boundary of the radio wave reachable area of the second node, and the second point may be determined by considering a position of a third node which is the closest to the second node.

Another exemplary embodiment of the present invention provides a route determining method of a moving object including determining, by the moving object, and a first node which is the closest to a current position, among a plurality of nodes; determining, by the moving object, a second node which is the closest to the first node; determining, by the moving object, a route of the determined second node direction from the current position; and determining whether the determined route of the moving object passes through a radio wave reachable area of the first node and moving the moving object to the determined route.

Another exemplary embodiment of the present invention provides a route determining apparatus of a moving object including: a first node determining unit which allows the moving object to determine a first node which is the closest to a current position, among a plurality of nodes; a first point determining unit which allows the moving object to determine a first point included in a radio wave reachable area of the first node; a second node determining unit which allows the moving object to determine a second node which is the closest to the first point; a second point determining unit which allows the moving object to determine the second point which is included in a radio wave reachable area of the second node by considering the first node and the position of the first point; and a first route control unit which moves the moving object to a position determined by the first node determining unit, the first point determining unit, the second node determining unit, and the second point determining unit.

The first point determining unit may determine the first point by considering a first time when it takes for the moving object to move from the boundary of the radio wave reachable area of the first node to an arbitrary point included in the radio wave reachable area and a second time when it takes for the moving object to receive data to be obtained by the moving object from the first node at the arbitrary point.

The second point determining unit may determine the second point by determining whether to be at a boundary of the radio wave reachable area of the second node and whether to be located in the closest distance from the first point.

The second point determining unit may determine the second point by determining whether to be at a boundary of the radio wave reachable area of the second node and whether to be located in the closest distance from the first node.

Another exemplary embodiment of the present invention provides a route determining apparatus of a moving object including: a first node determining unit which allows the moving object to determine a first node which is the closest to a current position, among a plurality of nodes; a second node determining unit which allows the moving object to determine a second node which is the closest to the first point; a second route control unit which determines a route in the direction of the second node determined from the current position and determines whether the determined route passes through the radio wave reachable area of the first node to move the moving object to the determined route.

The node visiting method and apparatus of the present invention suggest a route determining algorithm which allows a moving object to move the shortest distance to visit a plurality of destination nodes.

The node visiting method and apparatus of the present invention suggest a route determining algorithm which allows a moving object to move the shortest distance when a plurality of destination nodes having a predetermined radius area need to be visited.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In order to sufficiently understand the present invention, the operational advantages of the present invention, and the objectives achieved by the embodiments of the present invention, the accompanying drawings illustrating preferred embodiments of the present invention and the contents described therein need to be referred to.

Hereinafter, the present invention will be described in detail by explaining preferred embodiments of the present invention with reference to the accompanying drawings. However, the present invention can be realized in various different forms, and is not limited to the exemplary embodiments described herein. In order to clearly describe the present invention, a part which may obscure the present invention may be omitted and like reference numerals denote like components.

In the specification, unless explicitly described to the contrary, the word "comprise" and variations such as "comprises" or "comprising", will be understood to imply the inclusion of stated elements but not the exclusion of any other elements. In addition, the terms "unit", "-er", "-or", "module", and "block" described in the specification mean units for processing at least one function and operation and can be implemented by hardware components or software components and combinations thereof.

Figure 1:
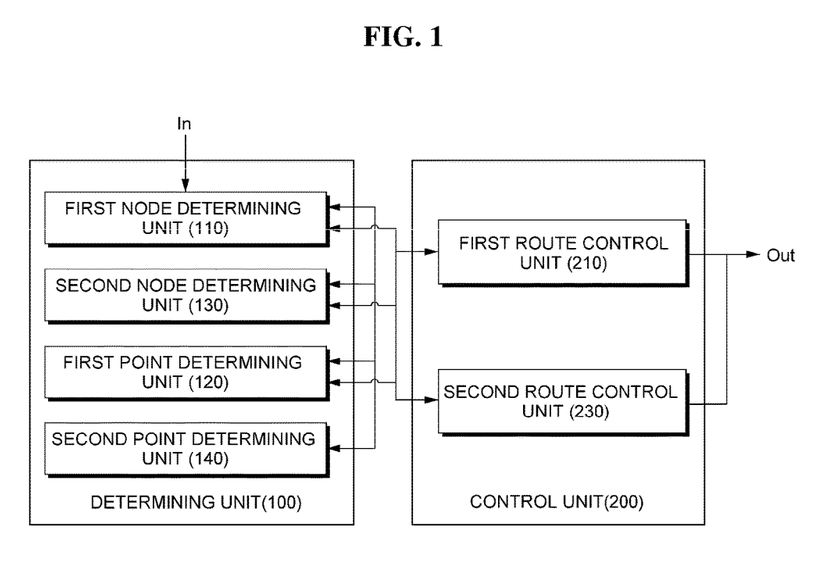
FIG. 1 is a block diagram of a route determining apparatus of a moving object according to an exemplary embodiment of the present invention.

FIG. 1 illustrates an example of a route determining apparatus according to an exemplary embodiment of the present invention.

Referring to FIG. 1, the route determining apparatus according to an exemplary embodiment of the present invention may include a determining unit 100 and a control unit 200. When the moving object goes through a plurality of destination nodes, the route determining apparatus according to an exemplary embodiment of the present invention suggests a device which determines an efficient moving route for saving a total consumed time and consumed energy. According to an exemplary embodiment of the present invention, as the moving object, an unmanned ground vehicle (UGV) or unmanned air vehicle (UAV) such as a drone may be considered. Further, as the plurality of destination nodes, data sensor nodes which sense, collect, and transmit predetermined data may be considered.

In this case, in order to effectively collect the data from the plurality of sensor nodes, the moving object such as a drone may move in accordance with a method suggested by the exemplary embodiment of the present invention and return to a sink node to transmit the data collected while moving.

In the exemplary embodiment of the present invention, a node to visit has a radio wave reachable area where data may be transmitted and received. As the moving object approaches the node, a data communication speed is increased. Hereinafter, a boundary of the radio wave reachable area mentioned below may be a maximum distance in which the moving object and the node are communicable, from the moving object. Desirably, it may be determined as a distance at which a sum of a time when the moving object accesses the node and a time when it takes to transmit and receive the data has a minimum value.

The determining unit 100 may include a first node determining unit 110, a first point determining unit 120, a second node determining unit 130, and a second point determining unit 140. The determining unit 100 determines nodes to visit and points as turning points which becomes a reference to determine the route of the moving object and transmits the determined information to the control unit 200.

The first node determining unit 110 may determine a first node which is the closest to a current position of the moving object among a plurality of nodes.

According to an exemplary embodiment of the present invention, the first node determining unit 110 may receive the information on the current position of the moving object from a position sensor to determine the first node which is the closest to the current position.

The first point determining unit 120 may determine a first point where the moving object is included in a radio wave reachable area of the first node. In this case, desirably, the first point determining unit 120 may determine an intersection point of a straight line connecting the current position to the first node and the boundary of the radio wave reachable area of the first node as the first point using the position information of the first node.

According to the exemplary embodiment of the present invention, the first point determining unit 120 may determine the first point by considering a first time when it takes for the moving object to move from the boundary of the radio wave reachable area of the first node to an arbitrary point included in the radio wave reachable area and a second time when it takes for the moving object to receive data to be obtained by the moving object from the first node at the arbitrary point. In this case, desirably, a position obtained by considering a communication speed with the sensor node and a moving speed of the moving object such that the sum of the first time and the second time has a minimum value may be determined as the first point.

The second node determining unit 130 may determine a second node which is the closest to the first point. The second node determining unit 130 may determine a second node using the position information of the first point.

The second point determining unit 140 may allow the moving object to determine the second point which is included in a radio wave reachable area of the second node by considering the first node and the position of the first point.

To one exemplary embodiment of the present invention, the second point determining unit 140 may determine whether to be at the boundary of the radio wave reachable area of the second node and to be located within the closest distance from the first point to determine the second point. In this case, desirably, the second point determining unit 120 may determine an intersection point of a straight line connecting the first point to the second node and the boundary of the radio wave reachable area of the second node as the second point using the position information of the second node.

According to one exemplary embodiment of the present invention, the second point determining unit 140 may determine whether to be at the boundary of the radio wave reachable area of the second node and to be located within the closest distance from the first node to determine the second point. In this case, intersection point where the straight line connecting the first node and the second node meets the boundary of the radio wave reachable area of the second node may be determined as the second point.

According to one exemplary embodiment of the present invention, the second point determining unit 140 may determine the second point by considering a position of a third node which is located between a first intersection point between a segment of a line connecting the first node and the second node and the boundary of the radio wave reachable area of the second node and a second intersection point between a segment of a line connecting the first point and the second node and the boundary of the radio wave reachable area of the second node and is the closest to the second node.

The control unit 200 may include a first route control unit 210 and a second route control unit 230. The control unit 200 may determine the route of the moving object with respect to the nodes and the points determined by the determining unit 100 and move the moving object. The control unit 200 may selectively include the second route control unit depending on an exemplary embodiment of the present invention.

The first route control unit 210 may move the moving object to a position determined by the first node determining unit 110, the first point determining unit 130, the second node determining unit 120, and the second point determining unit 140. The second route control unit 230 determines a route in the direction of the second node determined from the current position and determines whether the determined route passes through the radio wave reachable area of the first node to move the moving object to the determined route. In this case, the same determining process is performed on the plurality of nodes. Therefore, even though the route determined with respect to a node at a long distance overlaps the radio wave reachable area of the nodes at a short distance, the same determining process is applied to directly determine a route for a node with the long distance to move the moving object.

Figure 2:
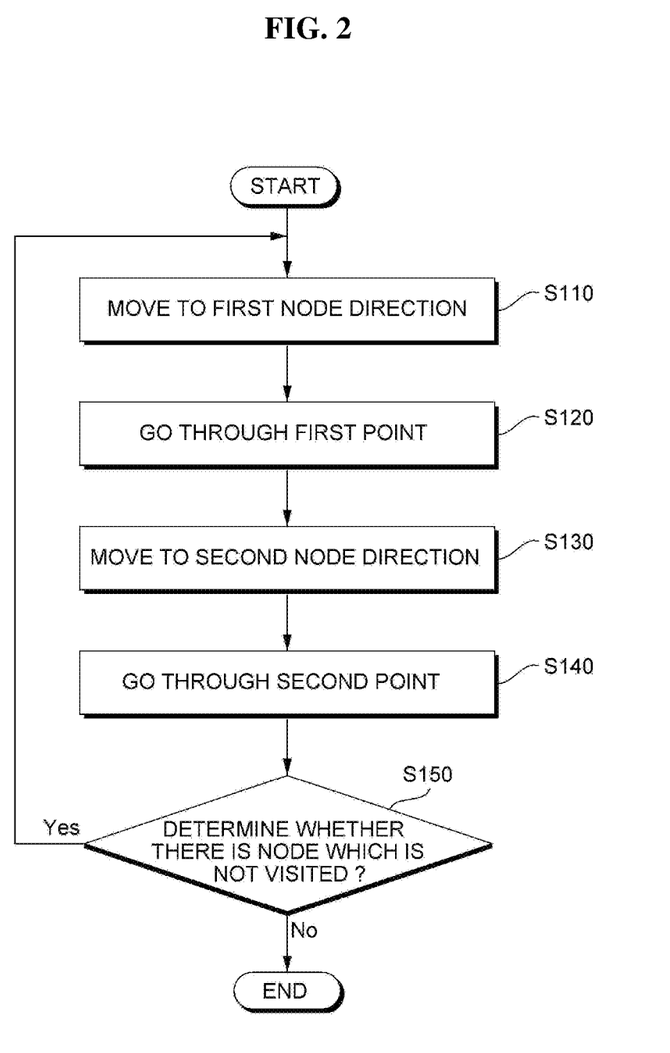
FIG. 2 is a flowchart of a route determining method of a moving object according to an exemplary embodiment of the present invention.

FIG. 2 illustrates an example of a route determining method according to an exemplary embodiment of the present invention.

The route determining method according to an exemplary embodiment of the present invention relates to a method of determining a route which efficiently goes through a plurality of sensor nodes having a radio wave reachable area. A moving object may move in accordance with a method suggested in the present invention to effectively collect data from a plurality of sensor nodes and transmit the collected data to a sink node.

Referring to FIG. 2, the route determining method according to an exemplary embodiment of the present invention may include a step of moving in a first node direction (S110), a step of going through a first point (S120), a step of moving in a second node direction (S130), a step of going through a second point (S140), and a step of determining whether there is a node which is not visited (S150).

In the step of moving in a first node direction (S110), a first node which is the closest to a current position of the moving object, among a plurality of nodes is determined and the moving object moves in the determined first node direction.

In the step of going through a first point (S120), a first point where the moving object is included in the radio wave reachable area of the first node, is determined and the moving object goes through the determined first point. In this case, a point where a segment of a line connecting the current position of the moving object and the position of the first node meets a boundary of the radio wave reachable area of the first node is determined as the first point.

According to the exemplary embodiment of the present invention, the first point through which the moving object goes may be determined by considering a first time when it takes for the moving object to move from the boundary of the radio wave reachable area of the first node to an arbitrary point included in the radio wave reachable area and a second time when it takes for the moving object to receive data to be obtained by the moving object from the first node at the arbitrary point.

For example, as the moving object is farther from the node, a communication time to transmit and receive data is increased. However, the moving time taken for the moving object to access the node needs to be considered. Therefore, a first point having the shortest distance from the node may be determined by considering the communication time and the moving time. In this case, a point having a distance at which a sum of a first time as a moving time of the moving object and a second time when it takes to transmit and receive data has a minimum value may be determined as the first point. Further, similarly to the boundary of the radio wave reachable area of each node which is mentioned in another exemplary embodiment, points spaced apart from each node by a distance where a sum of the time when it takes to transmit and receive the data from the nodes and the moving time has a minimum value may be included.

In the step of moving in a second node direction (S130), a second node which is the closest to the first point of the moving object is determined and the moving object moves to the determined second node direction.

In the step of going through a second point (S140), the second point which is included in a radio wave reachable area of the second node is determined by considering the first node and the position of the first point and the moving object goes through the second point.

According to one exemplary embodiment of the present invention, the second point may be determined by determining whether to be at the boundary of the radio wave reachable area of the second node and to be located within the closest distance from the first point. The second point may be determined by a point where a segment of a line connecting the first point and the second node meets the boundary of the radio wave reachable area of the second node.

According to another exemplary embodiment of the present invention, the second point may be determined by determining whether to be at the boundary of the radio wave reachable area of the second node and to be located in the closest distance from the first node. In this case, the second point may be determined by a point where a segment of a line connecting the first node and the second node meets the boundary of the radio wave reachable area of the second node.

According to another exemplary embodiment of the present invention, the second point is located between a first intersection point between a segment of a line connecting the first node and the second node and the boundary of the radio wave reachable area of the second node and a second intersection point between a segment of a line connecting the first point and the second node and the boundary of the radio wave reachable area of the second node. The second point may be determined by considering a position of a third node which is the closest to the second node.

In this case, the second point may be located at the boundary of the radio wave reachable area of the second node which connects the first intersection point and the second intersection point. In this case, a part of the boundary of the radio wave reachable area of the third node is determined as a segment of a line connecting a third intersection point of a segment of a line connecting the first intersection point and the third node and a boundary of a radio wave reachable area of the third node, a fourth intersection point of a straight line connecting the second intersection point and the third node and the boundary of a radio wave reachable area of the third node, and a fifth intersection point of a straight line connecting the second node and the third node. The second point may be determined such that the moving distance is the shortest by considering the part of the boundary.

In the step of determining whether there is a node which is not visited (S150), when the moving object goes through the second point, it is detected whether there is a node at which the moving object does not visit. When there is a node at which the moving object does not visit, the second point is considered as the current position and the procedure is performed starting from the step of moving in the first node direction (S110) again. When there is no node at which the moving object does not visit, the route determining ends and the moving object returns to a sink node.

Figure 3:
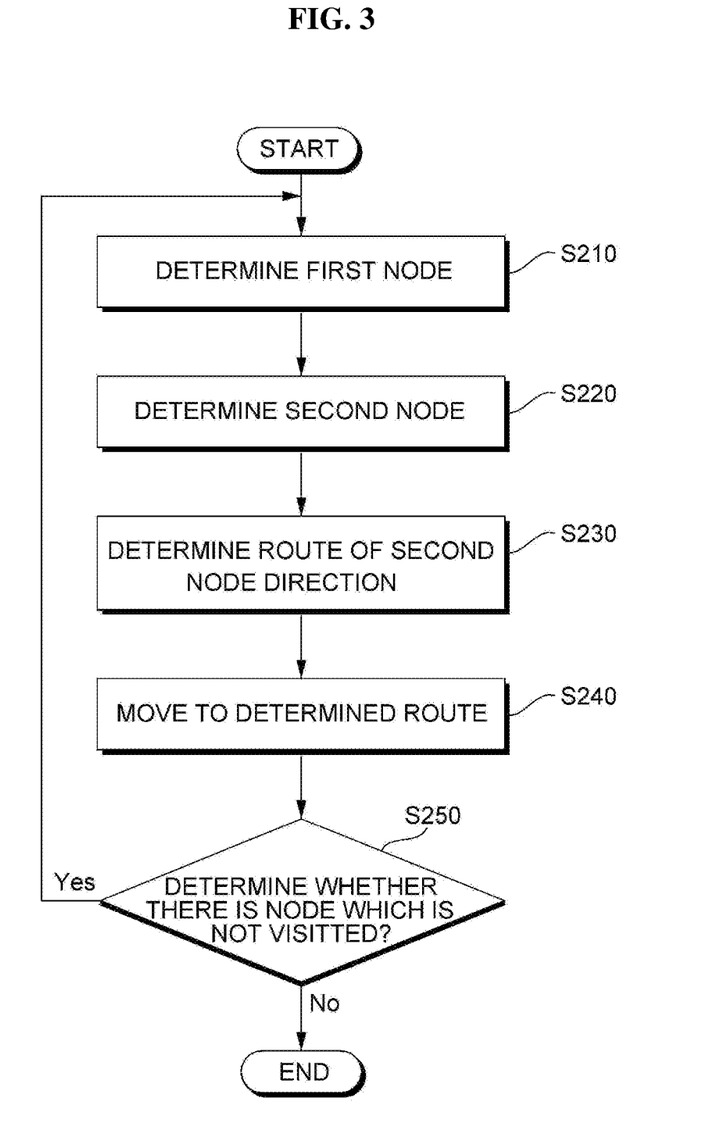
FIG. 3 is a flowchart of a route determining method of a moving object according to an exemplary embodiment of the present invention.

FIG. 3 illustrates an example of a route determining method according to an exemplary embodiment of the present invention.

The route determining method in FIG. 3 will be described below with reference to FIG. 1. Referring to FIG. 3, the route determining method according to an exemplary embodiment of the present invention may include a step of determining a first node (S210), a step of determining a second node (S220), a step of determining a route in the second node direction (S230), a step of moving to a determined route (S240), and a step of determining whether there is a node which is not visited (S250).

In the step of determining a first node (S210), the moving object may determine a first node which is the closest to a current position among a plurality of nodes.

In the step of determining a second node (S220), the moving object may determine a second node which is the closest to the first node.

In the step of determining a route in the second node direction (S230), the moving object may determine the route in the second node direction determined from the current position.

In the step of moving to a determined route (S240), it is determined whether the determined route of the moving object passes through the radio wave reachable area of the first node and the moving object moves to the determined route. In this case, the same process is performed on the plurality of nodes. When the moving route determined for the node at a long distance passes through the radio wave reachable area of the node located at the short distance, a route for the node at the long distance is directly determined to move the moving object.

In the step of determining whether there is a node which is not visited (S250), when the moving object goes through the second point, it is detected whether there is a node at which the moving object does not visit. When there is a node at which the moving object does not visit, the second point is considered as the current position and the procedure is performed starting from the step of moving in the first node direction (S210) again. When there is no node at which the moving object does not visit, the route determining ends and the moving object returns to a sink node.

Figure 4:
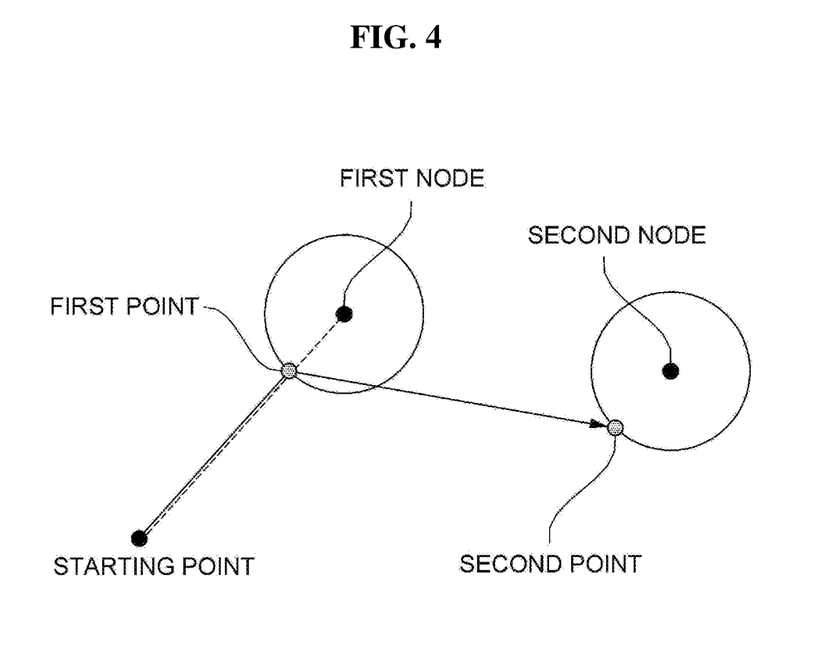
FIG. 4 is a flowchart of a route determining method of a moving object according to an exemplary embodiment of the present invention.

FIG. 4 illustrates an example of a route determining method according to an exemplary embodiment of the present invention. The route determining method in FIG. 4 will be described below with reference to FIG. 1.

A first node determining unit 110 of a determining unit 100 which may be provided in a moving object allows a moving object to search for a first node which is the closest to an arbitrary starting point, determine the first node, and move in the first node direction. The first point determining unit 120 searches for a first point and determines the first point as an arbitrary point included in the radio wave reachable area of the first node while the moving object moves. Since the data may be transmitted and received at the first point, the moving object receives the data at the first point and goes through the first point. The second node determining unit 130 may search for and determine a second node which is the closest to the first point and allow the moving object to move in the second node direction. In this case, since the moving object may communicate with the second node at the second point as an arbitrary point included in the radio wave reachable area of the second node, the second point determining unit 140 may search for and determine the second point and allow the moving object to receive data and go through the second point.

In this case, the first point and the second point may be determined by considering a first time when it takes to move from the boundary of the radio wave reachable area of the first node to an arbitrary point included in the radio wave reachable area and a second time when it takes for the moving object to receive data to be obtained by the moving object from the first node at the arbitrary point. Specifically, the first point and the second point may be determined such that the sum of the first time and the second time has a minimum value. In this case, desirably, the first point and the second point may be determined by a point where the sum of the first time as a moving time and the second time when it takes for the moving object to receive the data has a minimum value may be determined.

As illustrated in FIG. 4, when the moving object moves along the determined route, the moving distance may be shortened as compared with a route which is determined such that the moving object sequentially visits the current position, the first node, and the second node to collect data.

Figure 5:
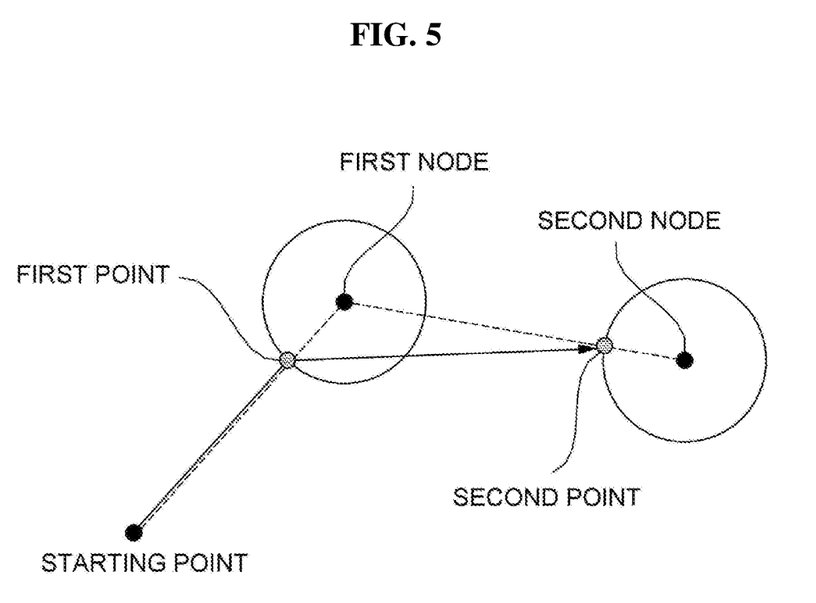
FIG. 5 illustrates a route determining method of a moving object according to an exemplary embodiment of the present invention.

FIG. 5 illustrates an example of a route determining method according to an exemplary embodiment of the present invention. The route determining method in FIG. 5 will be described below with reference to FIG. 1.

A first node determining unit 110 of a determining unit 100 which may be provided in a moving object searches for and determines a first node which is the closest to an arbitrary starting point and allows the moving object to move to the first node direction. Since the data may be transmitted and received at the first point which is the closest to the starting point as an arbitrary point included in the radio wave reachable area of the first node while the moving object moves, the first point determining unit 120 searches for the first node and determines the first node. The second node determining unit 130 searches for a second node which is the closest to the first point and determines the second node and moves the moving object in the second node direction. In this case, since the moving object may communicate with the second node at the second point which is the closest to the first node as an arbitrary point included in the radio wave reachable area of the second node, the second point determining unit 140 may search for and determine the second point and allow the moving object to go through the second point. In this case, a route determining algorithm as illustrated in FIG. 5 may be defined as a directional NN algorithm (DNN).

In this case, similarly to the exemplary embodiment illustrated in FIG. 4, the first point and the second point may be determined by considering the first time and the second time. Specifically, the first point and the second point may be determined such that the sum of the first time and the second time has a minimum value.

When the moving object moves along the route determined by the method which is illustrated in FIG. 5, the moving distance may be shortened as compared with a route which is determined such that the moving object sequentially visits the current position, the first node, and the second node to collect data.

Figure 6:
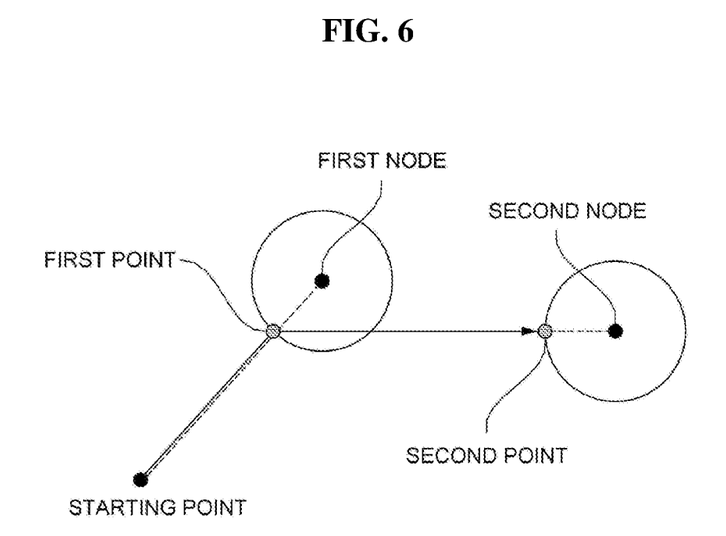
FIG. 6 illustrates a route determining method of a moving object according to an exemplary embodiment of the present invention.

FIG. 6 illustrates an example of a route determining method according to an exemplary embodiment of the present invention. The route determining method in FIG. 6 will be described below with reference to FIG. 1.

A first node determining unit 110 of a determining unit 100 which may be provided in a moving object searches for and determines a first node which is the closest to an arbitrary starting point and move the moving object in the first node direction. Since the data may be transmitted and received at the first point which is the closest to the starting point as an arbitrary point included in the radio wave reachable area of the first node while the moving object moves, the first point determining unit 120 goes through the first point. The second node determining unit 130 searches for a second node which is the closest to the first point and determines the second node and moves the moving object to the second node direction. In this case, since the moving object may communicate with the second node at the second point which is the closest to the first point as an arbitrary point included in the radio wave reachable area of the second node, the second point determining unit 140 allows the moving object to go through the second point. In this case, a route determining algorithm as illustrated in FIG. 6 may be defined as a direct directional NN algorithm (DDNN).

In this case, similarly to the exemplary embodiment illustrated in FIG. 4, the first point and the second point may be determined by considering the first time and the second time. Specifically, the first point and the second point may be determined such that the sum of the first time and the second time has a minimum value.

When the moving object moves along the route determined by the method which is illustrated in FIG. 6, the moving distance may be shortened as compared with a route which is determined such that the moving object sequentially visits the current position, the first node, and the second node to collect data.

Figure 7:
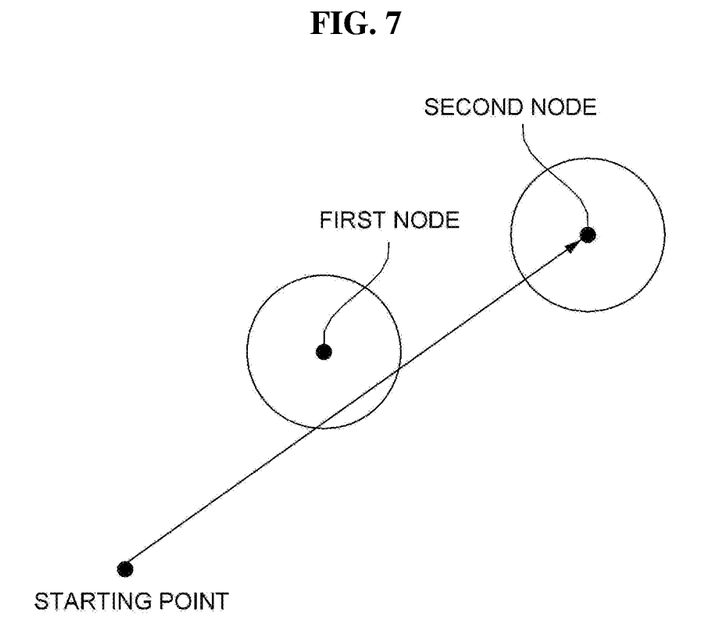
FIG. 7 illustrates a route determining method of a moving object according to an exemplary embodiment of the present invention.

FIG. 7 illustrates an example of a route determining method according to an exemplary embodiment of the present invention. The route determining method in FIG. 7 will be described below with reference to FIG. 1.

A first node determining unit 110 of a determining unit 100 which may be provided in a moving object searches for and determines a first node which is the closest to an arbitrary starting point. The second node determining unit 130 searches for and determines the second node which is the closest to the first node. A second route control unit 230 which may be included in the control unit 200 of the moving object allows the moving object to go through the first node and move to the second node. In this case, a route from the starting point to the second node is determined. Further, it is determined whether the determined route passes through the radio wave reachable area of the first node. Therefore, the moving object may move to the determined route without going through the first node. In this case, a route determining algorithm as illustrated in FIG. 7 may be defined as a by-passing of nodes in the NN algorithm (PNN).

In this case, similarly to the exemplary embodiment illustrated in FIG. 4, the first point and the second point may be determined by considering the first time and the second time. Specifically, the first point and the second point may be determined such that the sum of the first time and the second time has a minimum value.

When the moving object moves the route determined by the method which is illustrated in FIG. 7, the moving distance may be shortened as compared with a route which is determined such that the moving object sequentially visits the current position, the first node, and the second node to collect data.

FIGS. 8A to 8D illustrate simulation results according to exemplary embodiments of the present invention in FIGS. 5 to 7. In FIGS. 8A to 8D, in accordance with the nearest neighbor algorithm (NN) and route determining method algorithms in FIGS. 5 to 7, when a radio wave reachable distance is 7 and an area where the sensors are scattered in 100*100, moving distances of the moving object which visits 25 arbitrary sensor nodes and returns to the starting point are compared.

Figure 8A:
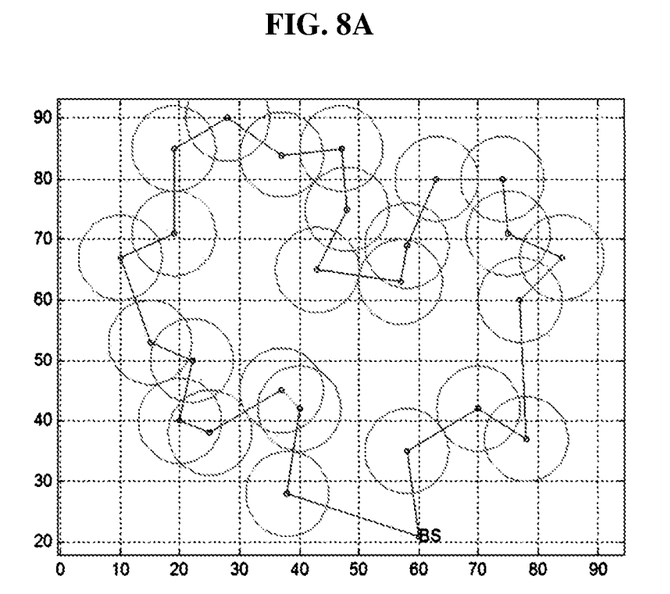
FIGS. 8A to 8D illustrate simulation results of a route determining method of a moving object of FIGS. 5 to 7.

FIG. 8A illustrates a simulation result according to a route determining method in accordance with the NN algorithm. The NN algorithm is an algorithm in which the moving object sequentially visits the closes 20t destination in a method of going through a plurality of destinations. The route determining method in accordance with the NN algorithm is a method by which the moving object sequentially visits a node which is the closest to the current position. But, a radio wave reachable distance of the node is not considered. According to the simulation result, the moving distance while the moving object goes through 25 nodes and returns is 302.2723 in accordance with the NN algorithm.

Figure 8B:
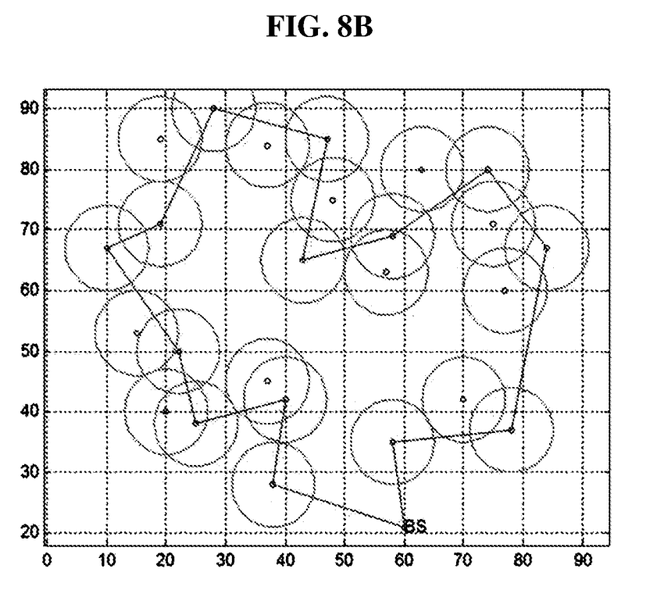

FIG. 8B illustrates a simulation result according to a route determining method illustrated in FIG. 7. As illustrated in FIG. 7, the first node which is the closest to the starting point is determined and then the second node which is the closest to the first node may be determined. The moving object may go through the first node and then move to the second node. In this case, a route from the starting point to the second node is determined. Further, it is determined whether the determined route passes through the radio wave reachable area of the first node. Therefore, the moving object may go through 25 nodes, which are scattered, to return in accordance with the route determining method by a by-passing of nodes in the NN algorithm (PNN) so that the moving object moves to the determined route without going through the first node. As a result, the moving distance in accordance with the PNN algorithm is 273.0246.

Figure 8C:
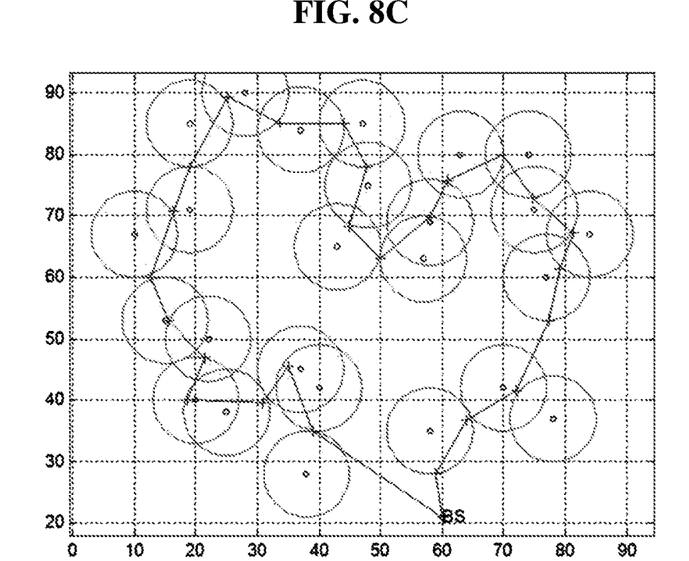

FIG. 8C illustrates a simulation result according to a route determining method illustrated in FIG. 5. As illustrated in FIG. 5, the first node which is the closest to the starting point is determined to move the moving object. The moving object goes through the first point which is the closest to the starting point as an arbitrary point included in the radio wave reachable area of the first node and searches for and determines a second node which is the closest to the first point. The moving object moves in the second node direction. Therefore, the moving object may go through 25 nodes to return in accordance with a route determining method by the directional NN algorithm (DNN) as a method by which the moving object goes through the second point which is an arbitrary point included in the reachable area of the radio wave of the second node. Further, the second point is closest to the first node. As a result, the moving distance in accordance with the DNN algorithm is 220.4762.

Figure 8D:
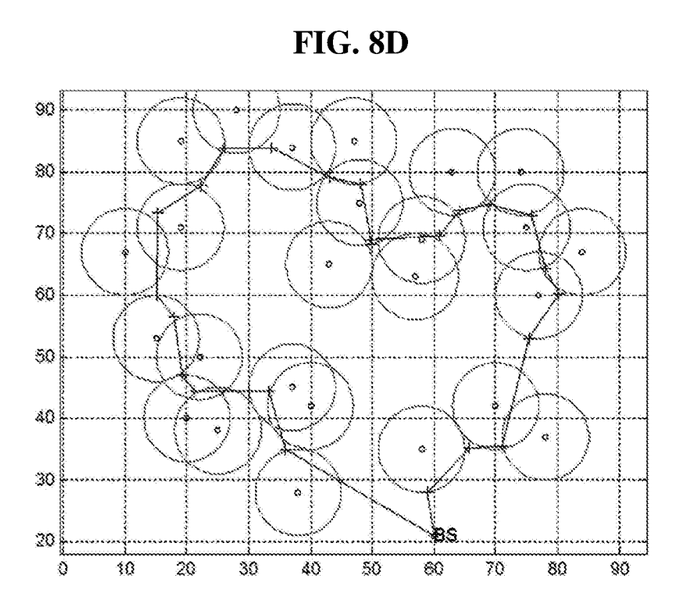

FIG. 8D illustrates a simulation result according to a route determining method illustrated in FIG. 6. As illustrated in FIG. 6, the first node which is the closest to the starting point is determined and the moving object moves in the first node direction. Since the data may be transmitted and received at the first point which is the closest to the starting point as an arbitrary point included in the radio wave reachable area of the first node, the moving point goes through the first point. The second node which is the closest to the first point is searched and determined and the moving object moves in the second node direction. In this case, the moving object may go through 25 nodes to return in accordance with a route determining method by the direct directional NN algorithm (DDNN) as a method by which the moving object goes through the second point which is an arbitrary point included in the reachable area of the radio wave of the second node. Further, the second point is closest to the first point. As a result, the moving distance in accordance with the DDNN algorithm is 220.9397.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A route determining method of a moving object, the method comprising:
    determining, by the moving object, a first node which is the closest to a current position of the moving object, among a plurality of nodes by using a position sensor, and moving the moving object in a direction of the determined first node;
    determining, by the moving object, a first point included in a radio wave reachable area of the first node by transmitting and receiving data between the moving object and the first node, and going through, by the moving object, the determined first point;
    determining, by the moving object, a second node which is the closest to the first point by using the position sensor, and moving the moving object in a direction of the determined second node; and
    determining, by the moving object, a second point included in a radio wave reachable area of the second node by transmitting and receiving the data between the moving object and the second node based on the first node and a position of the first point and going through, by the moving object, the second point.

2. The method of claim 1, wherein in the determining of the second point, the second point is determined by determining whether to be at a boundary of the radio wave reachable area of the second node and whether to be located in the closest distance from the first point.

3. The method of claim 1, wherein in the determining of the second point, the second point is determined by determining whether to be at a boundary of the radio wave reachable area of the second node and whether to be located in the closest distance from the first node.

4. The method of claim 1, wherein in the determining, by the moving object, the first point included in the radio wave reachable area of the first node, the first point is determined by considering a first time when it takes for the moving object to move from a boundary of the radio wave reachable area of the first node to an arbitrary point included in the radio wave reachable area and a second time when it takes for the moving object to receive data to be obtained from the first node at the arbitrary point.

5. The method of claim 1, wherein in the determining of the second point, the second point is located between a first intersection point between a segment of a line connecting the first node and the second node and a boundary of the radio wave reachable area of the second node and a second intersection point between a segment of a line connecting the first point and the second node and the boundary of the radio wave reachable area of the second node, and the second point is determined by considering a position of a third node which is the closest to the second node.

6. A route determining method of a moving object, the method comprising:
    determining, by the moving object, a first node which is the closest to a current position of the moving object, among a plurality of nodes by using a position sensor;
    determining, by the moving object, a second node which is the closest to the first node by using the position sensor;
    determining, by the moving object, a route in a direction of the determined second node from the current position based on (i) a communication time to transmit and receive data between the moving object and the plurality of nodes and (ii) an estimated moving time of the moving object; and
    determining whether the determined route of the moving object passes through a radio wave reachable area of the first node by transmitting and receiving the data between the moving object and the first node, and moving the moving object to the determined route.

7. A route determining apparatus of a moving object, the apparatus comprising:
    a processor; and
    a memory configured to store instructions executable by the processor,
    wherein the processor is configured to:
    determine a first node which is the closest to a current position of the moving object, among a plurality of nodes by using a position sensor;
    determine a first point included in a radio wave reachable area of the first node by transmitting and receiving data between the moving object and the first node;
    determine a second node which is the closest to the first point by using the position sensor;
    determine a second point which is included in a radio wave reachable area of the second node by transmitting and receiving the data between the moving object and the second node based on the first node and a position of the first point; and
    move the moving object to a position determined by the determining of the first node, the determining of the first point, the determining of the second node and the determining of the second point.

8. The apparatus of claim 7, wherein the processor is further configured to determine the second point by determining whether to be at a boundary of the radio wave reachable area of the second node and whether to be located in the closest distance from the first point.

9. The apparatus of claim 7, wherein the processor is further configured to determine the second point by determining whether to be at a boundary of the radio wave reachable area of the second node and whether to be located in the closest distance from the first node.

10. The apparatus of claim 7, wherein the processor is further configured to determine the first point by considering a first time when it takes for the moving object to move from a boundary of the radio wave reachable area of the first node to an arbitrary point included in the radio wave reachable area and a second time when it takes for the moving object to receive data to be obtained by the moving object from the first node at the arbitrary point.

11. A route determining apparatus of a moving object, the apparatus comprising:
a processor; and
a memory configured to store instructions executable by the processor,
wherein the processor is configured to:
determine a first node which is the closest to a current position of the moving object, among a plurality of nodes by using a position sensor;
determine a second node which is the closest to the first node by using the position sensor;
determine a route in a direction of the determined second node from the current position based on (i) a communication time to transmit and receive data between the moving object and the plurality of nodes and (ii) an estimated moving time of the moving object, and determine whether the determined route passes through a radio wave reachable area of the first node by transmitting and receiving the data between the moving object and the first node to move the moving object to the determined route.

* * * * *